Oct. 12, 1926.
O. D. MASTERSON
PITMAN BEARING FOR OIL DERRICKS
1,602,694
Filed May 21, 1925   3 Sheets-Sheet 1
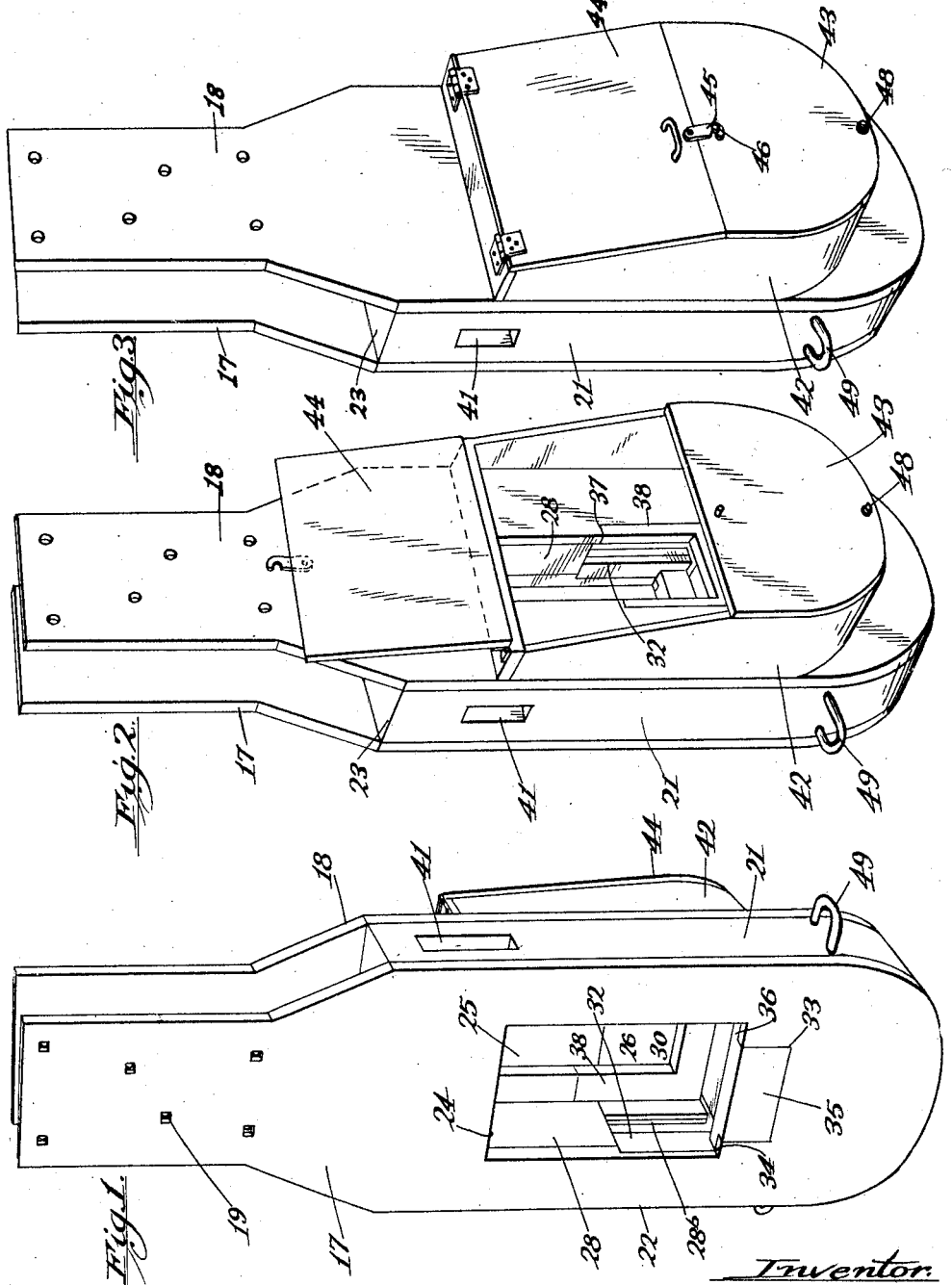

Oct. 12, 1926.
O. D. MASTERSON
PITMAN BEARING FOR OIL DERRICKS
Filed May 21, 1925    3 Sheets-Sheet 2
1,602,694
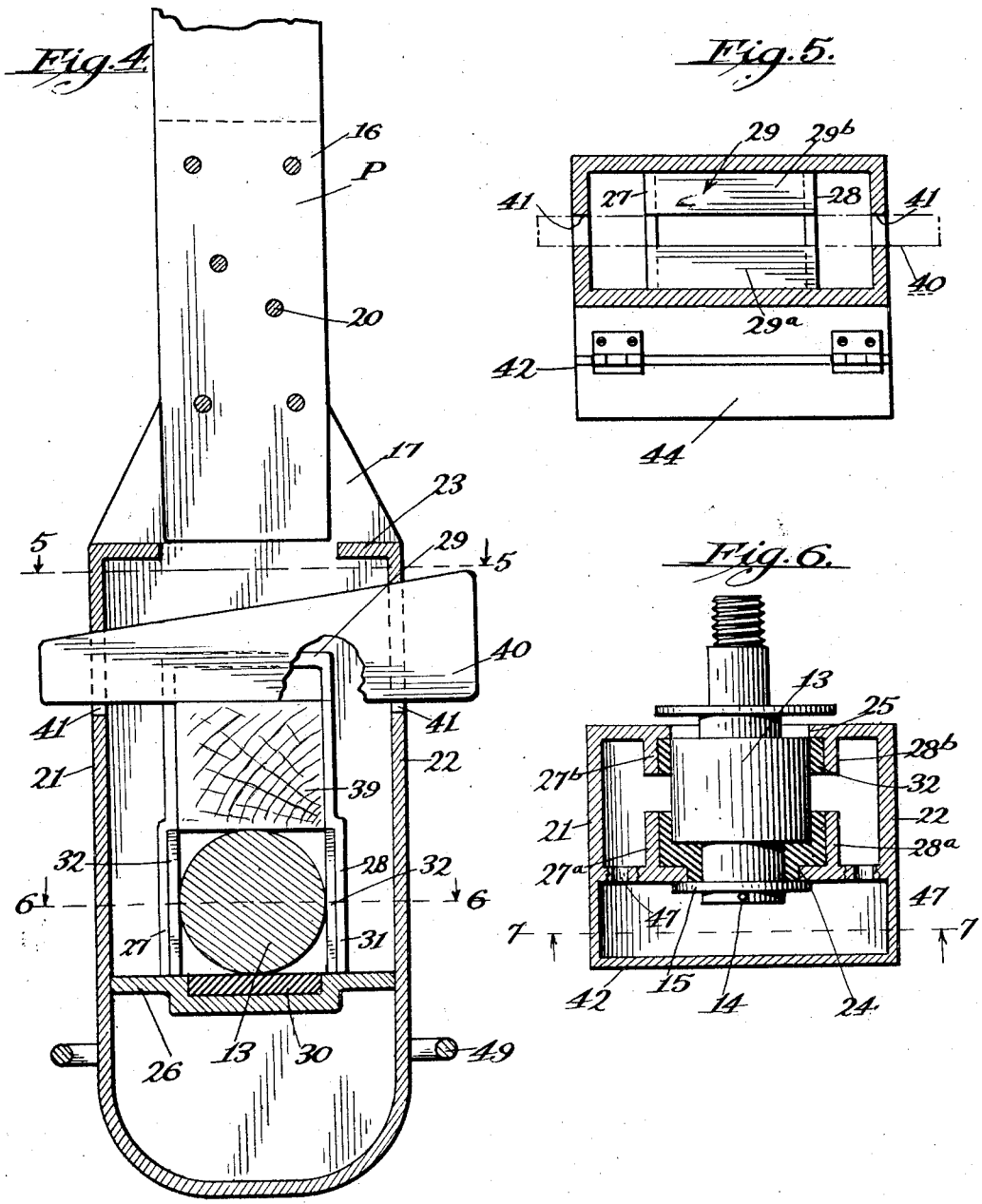

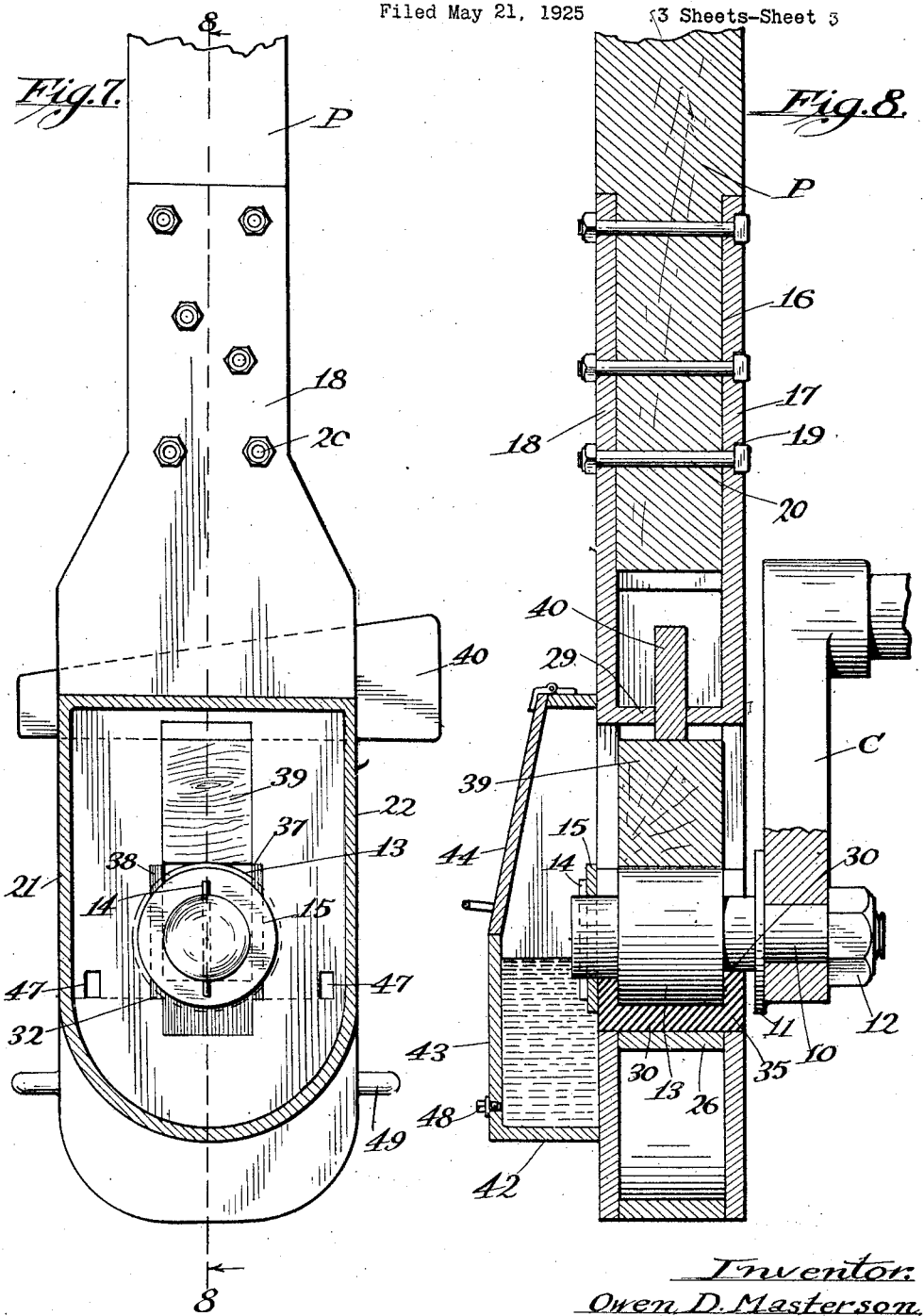

Patented Oct. 12, 1926.

1,602,694

UNITED STATES PATENT OFFICE.

OWEN D. MASTERSON, OF TUPMAN, CALIFORNIA, ASSIGNOR OF ONE-THIRD TO FRANK FINWICK, OF BAKERSFIELD, CALIFORNIA.

PITMAN BEARING FOR OIL DERRICKS.

Application filed May 21, 1925. Serial No. 31,948.

This invention relates to improvements in bearings for pitman rods upon well drilling derricks.

Heretofore it has been customary practice to establish the connection between the pitman rod which is connected to the walking beam on a well drilling derrick to the crank which is mounted upon the band wheel by forming a slot or hole in the lower end of the pitman rod and inserting the pin which is upon the crank on the band wheel into the aperture in the wooden pitman rod. A follower block is frequently inserted in the aperture and is driven against the pin by means of a wedge so as to keep the pin on the crank tight within the pitman rod. No means of lubrication is provided except by pouring oil or grease on the pin before it is inserted into the pitman rod. As a consequence, the lubrication lasts but a very short while and the bearing becomes very hot and inefficient.

An object of this invention is to provide an improved bearing or connection between a pitman rod and the crank on the band wheel which is so constructed as to be capable of sustaining the heavy loads required, which will prevent end-play between the pitman rod and the pin and which will provide an efficient means of lubrication, enabling the band wheel to drive the pitman rod for a considerable length of time without getting out of order or getting hot.

With the foregoing and other objects in view which will be made manifest in the following detailed description and specifically pointed out in the appended claims, reference is had to the accompanying drawings for an illustrative embodiment of the invention, wherein:

Figure 1 is a perspective view of the bearing which is adapted to be applied to the pitman rod showing that side of the bearing which is disposed adjacent the crank on the band wheel, Fig. 2 is a perspective view of the opposite side of the bearing, the cover for the oil reservoir being shown in open position, Fig. 3 is a perspective view similar to Fig. 2, the cover of the oil reservoir being illustrated in closed position, Fig. 4 is a vertical section through the bearing, Fig. 5 is a horizontal section taken on the line 5—5 of Fig. 4, Fig. 6 is a horizontal section taken substantially on the line 6—6 of Fig. 4, Fig. 7 is a vertical section taken substantially on the line 7—7 of Fig. 6, and Fig. 8 is a vertical section taken on the line 8—8 of Fig. 7.

Referring to the accompanying drawings wherein similar reference characters designate similar parts throughout, the crank upon the band wheel on a drilling derrick is illustrated at C in Fig. 8, which carries a pin 10, which is an improved construction and which is especially adapted to cooperate with the bearing provided upon the pitman rod. The pin 10 is provided with a flange 11 positioned against the outer face of the crank C and this flange is tightened against the crank C by a nut 12. Outwardly from the flange 11 there is formed upon the pin 10 a cylindrical enlargement 13 for a purpose hereinafter to be described. The outer end of the pin 10 has an aperture therethrough capable of receiving a locking pin 14 adapted to lock a washer 15 on the pin.

The pitman rod which is connected to the walking beam on the drilling derrick is illustrated at P. In mounting the bearing of the improved construction on the pitman rod, the sides of the lower end of the pitman rod are preferably reduced, as indicated at 16, so that end plates 17 and 18 may be positioned thereon and have their outside surfaces flush with the surfaces of the pitman rod P. The end plate 17 has squared recesses 19 formed therein for the reception of the heads of bolts 20 which extend through the end plates 17 and 18 and through the lower end of the pitman rod P. The heads of the bolts 20 are approximately even with the outer surface of the end plate 17, so that they will in no way engage or in any way interfere with the crank C upon rotation of the crank. The end plates 17 and 18 extend a considerable distance below the end of the conventional wooden pitman rod P. Side plates 21 and 22 are provided which connect the side edges of the end plates 17 and 18. These side plates may be provided by a single piece of metal which is bent U-shaped in form, as clearly illustrated in Fig. 4, and which has its upper ends bent inwardly, as indicated at 23. The ends 23 are positioned between the end plates 17 and 18 and, if desired, may form an abutment for the lower end of the pitman rod P or the lower end of the pitman rod P may extend downwardly a sufficient distance so as to be positioned between the ends 23.

A rectangular aperture 24 is formed in the end plate 17 and a similar aperture 25 is formed in the end plate 18. A bottom 26 is supported between the end plates 17 and 18 and between the side plates 21 and 22. This bottom is arranged a suitable distance below the bottom edges of the apertures 24 and 25.

Inner side walls 27 and 28 extend upwardly from the bottom 26 between the end plates 17 and 18. As clearly illustrated in Fig. 6, these side walls are divided, the side wall 27 being formed of a portion 27$^a$ and a portion 27$^b$, and the side wall 28 being formed of a portion 28$^a$ and a portion 28$^b$, the portions 27$^a$ and 28$^a$ extending toward the band wheel from the end plate 18, and the portions 27$^b$ and 28$^b$ extending toward the end plate 18 from the plate 17. The upper ends of the inner walls 27 and 28 are connected by a top wall 29, which is divided into portions 29$^a$ and 29$^b$. The bottom 26 together with the lower ends of the inner side walls 27 and 28 and the lower ends of the end plates 17 and 18 which are disposed below the apertures 24 and 25 cooperate to form a pocket, which receives the lower portion of the cylindrical enlargement 13 upon the pin 10.

The ends of the cylindrical enlargement 13 engage the ends of the pocket provided upon the end plates 17 and 18 so as to prevent lateral or end-play of the pitman rod P upon the pin.

The object of this invention is to line the pockets so formed with a bearing metal, preferably Babbitt metal. Therefore the center of the bottom 26 is depressed, as indicated in Fig. 4, and this depression is filled with the bearing metal, indicated at 30. The lower ends of the inner side walls 27 and 28 are shown as forming recesses or pockets 31 which receive bearing metal 32. In order to provide bearing metal upon the end walls of the pocket, the aperture 24 in the plate 17 is shown as cut downwardly at 33. Furthermore, the inside surfaces of the end plate 17 are cut away as indicated at 34. Bearing metal 35 is positioned within the recess or cut-away portion 33 and this bearing metal has laterally extending portions 36, filling the cut-away portions 34. The laterally extending portions 36 abut against the bearing metal 32 which is arranged in the recesses or pockets 31 on the inner side walls 27 and 28. The aperture 25 in the end plate 18 is somewhat enlarged, as indicated at 37, and the space provided by cutting away this additional portion of the end plate 18 is filled with bearing metal 38, extending around so as to cover the interior surfaces of the end plate 18 adjacent the bottom of the aperture 25.

In this manner it will be appreciated that the interior surfaces of the pocket are completely lined with a bearing metal. The bearing metal may be poured and cast in place, or may be applied in the form of sections which are secured in place.

A block 39 of wood is inserted through the apertures 25 and 24 and this block bears upon the top of the cylindrical enlargement 13. It is pushed downwardly by means of a wedge 40, which is driven through apertures 41 formed in the side plates 21 and 22 and which extends between the sections of the top wall 29$^a$ and 29$^b$ and between the upper ends of the portions 27$^a$, 28$^a$, 27$^b$ and 28$^b$. This block maintains the lower portion of the cylindrical enlargement 13 within the pocket so that there can be no end-play, and a comparatively tight bearing will be provided.

As a means for supplying lubricant to the pin 10 and to the pocket within which the cylindrical enlargement 13 is disposed, a container 42 is mounted upon the end plate 18. This container has a front wall 43 which extends slightly above the bottom 26. A hinged door 44 closes the upper end of the container 42, and may be latched in place as by a latch 45 engaging a stud 46. In the end plate 18 there are formed apertures 47 which are arranged slightly above the bottom 26. The lubricant container 42 provides a reservoir for lubricant, such as heavy oil, and this oil may readily flow through the apertures 47 between the inner side walls 27 and 28 and the side plates 21 and 22 and can then flow between the portions 27$^a$ and 27$^b$ and 28$^a$ and 28$^b$ into the pocket, so as to keep the cylindrical enlargement 13 continually rotating in a bath of oil on bearing metal.

A plug 48 closes an aperture in the bottom of the lubricant container 42, permitting this container to be drained and refilled with fresh oil whenever desired.

If desired, handles 49 may be mounted upon the lower ends of the side plates 21 and 22 for facilitating the lifting of the pitman rod P so as to position it upon the pin 10 carried by the crank C.

It will be understood that in applying the pitman rod to the pin 10 on the crank C, the cylindrical enlargement 13 is first caused to enter through the aperture 24 in the plate 17. After it has entered the aperture, the pitman rod is raised so as to cause the bottom of the enlargement to enter the pocket. The block 39 is then positioned in place and the wedge 40 is driven home so as to maintain the bottom of the cylindrical enlargement in the pocket, thus preventing end-play. The washer 15 can then be positioned upon the end of the pin 10 and the locking pin 14 inserted in place so as to maintain the washer on the pin 10.

By the improved construction, it will be readily appreciated that an improved connection between a pitman rod and a crank upon the band wheel is provided, which provides a pin bearing upon bearing metal, and which is continually and efficiently lubricated, enabling the connection to carry the heavy loads required. Furthermore, end-play or whipping of the pitman rod is efficiently prevented by the engagement of the ends of the cylindrical enlargement upon the interior surfaces of the end walls of the pocket.

It will be understood that the above construction is practically limited to pitman rods which are maintained in approximately vertical position throughout the cycle of their movement, and as the pitman rods which are fastened to the walking beam on drilling derricks necessarily move in such cycles, the improved bearing is especially adapted to be used in connection with them.

It will be understood that various changes in the detail of construction may be made without departing from the spirit or scope of the invention as defined by the appended claims.

I claim:

1. A connection between pitman rods and cranks upon band wheels on drilling derricks comprising a pin mounted upon the crank having a cylindrical enlargement thereon, a bearing provided upon the pitman rod, said bearing having its bottom below its end walls and forming a pocket adapted to receive the lower portion of said enlargement, whereby when the pin is placed in the bearing, the ends of the enlargement will bear against said end walls and end-play is prevented, and means for maintaining the enlargement on the pin within said pocket.

2. A connection between pitman rods and cranks upon band wheels on drilling derricks comprising a pin mounted upon the crank having a cylindrical enlargement thereon, a bearing provided upon the pitman rod, said bearing having its bottom below its end walls and forming a pocket adapted to receive the lower portion of said enlargement, whereby when the pin is placed in the bearing, the ends of the enlargement will bear against said end walls and end-play is prevented, and means for maintaining the enlargement on the pin within said pocket, the bottom, side and end surfaces of the pocket engaging the pin consisting of a bearing metal.

3. A connection between pitman rods and cranks upon band wheels on drilling derricks comprising a pin mounted upon the crank having a cylindrical enlargement thereon, a bearing provided upon the pitman rod, said bearing having its bottom below its end walls and forming a pocket adapted to receive the lower portion of said enlargement, whereby when the pin is placed in the bearing, the ends of the enlargement will bear against said end walls and end-play is prevented, means for maintaining the enlargement on the pin within said pocket, and means for supplying a lubricant to said pocket.

4. A connection between pitman rods and cranks upon band wheels on drilling derricks comprising a pin mounted upon the crank having a cylindrical enlargement thereon, a bearing provided upon the pitman rod, said bearing having its bottom below its end walls and forming a pocket adapted to receive the lower portion of said enlargement, whereby when the pin is placed in the bearing, the ends of the enlargement will bear against said end walls and end-play is prevented, means for maintaining the enlargement on the pin within said pocket, a lubricant reservoir associated with the bearing, and means whereby the lubricant in the reservoir may be supplied therefrom to the pocket.

5. A connection between a pitman rod and the crank upon the band wheel of a drilling derrick comprising a pin upon the crank having a cylindrical enlargement formed thereon, means mounted upon the pitman rod providing an aperture capable of receiving said pin with its enlargement, there being a pocket formed adjacent said aperture capable of receiving a portion of the enlargement upon the pin, said pocket providing end walls abutting portions of said enlargement so as to prevent end-play, and means for maintaining the enlargement on the pin in the pocket.

6. A connection between a pitman rod and the crank upon the band wheel of a drilling derrick comprising a pin upon the crank having a cylindrical enlargement formed thereon, means mounted upon the pitman rod providing an aperture capable of receiving said pin with its enlargement, there being a pocket formed adjacent said aperture capable of receiving a portion of the enlargement upon the pin, said pocket providing end walls abutting the ends of said enlargement so as to prevent end-play, and means for maintaining the enlargement on the pin in the pocket comprising a block receivable in the aperture and wedge means for urging said block against the pin opposite the pocket.

7. A connection between a pitman rod and the crank upon the band wheel of a drilling derrick comprising a pin upon the crank having a cylindrical enlargement formed thereon, means mounted upon the pitman rod providing an aperture capable of receiving said pin with its enlargement, there being a pocket formed adjacent said aperture capable of receiving a portion of the enlargement upon the pin, said pocket providing end walls abutting the ends of said enlargement so as to prevent end-play, and means for maintaining the enlargement on the pin in the pocket, the sides, bottom and ends of the pocket consisting of a bearing metal.

8. A connection between a pitman rod and the crank upon the band wheel of a drilling derrick comprising a pin upon the crank having a cylindrical enlargement formed thereon, means mounted upon the pitman rod providing an aperture capable of receiving said pin with its enlargement, there being a pocket formed adjacent said aperture capable of receiving a portion of the enlargement upon the pin, said pocket providing end walls abutting the ends of said enlargement so as to prevent end-play, means for maintaining the enlargement on the pin in the pocket, and means for supplying lubricant to the pocket through the side walls thereof.

9. A connection between a pitman rod and the crank upon the band wheel of a drilling derrick comprising a pin upon the crank having a cylindrical enlargement formed thereon, means mounted upon the pitman rod providing an aperture capable of receiving said pin with its enlargement, there being a pocket formed adjacent said aperture capable of receiving a portion of the enlargement upon the pin, said pocket providing end walls abutting the ends of said enlargement so as to prevent end-play, means for maintaining the enlargement on the pin in the pocket, a lubricant reservoir carried by the pitman rod, and means for supplying lubricant therefrom to the pocket.

10. A connection between a pitman rod and a band wheel crank on drilling derricks comprising a pin mounted upon the crank having a cylindrical enlargement, a pair of end plates mounted upon the pitman rod, side plates connecting the side edges of the end plates, there being a rectangular aperture formed in one of the end plates, a bottom arranged between the end and side plates below the bottom of said aperture, inner side walls extending upwardly from the bottom adjacent the side edges of the aperture and cooperating with the bottom end portions of the end plates below said aperture to form a pocket, the aperture being capable of receiving a pin and enlargement so that a portion of the enlargement may be positioned in said pocket with the end walls thereof engaging the ends of the enlargement so as to prevent end-play, and means for maintaining a portion of the enlargement in the pocket.

11. A connection between a pitman rod and a band wheel crank on drilling derricks comprising a pin mounted upon the crank having a cylindrical enlargement, a pair of end plates mounted upon the pitman rod, side plates connecting the side edges of the end plates, there being a rectangular aperture formed in one of the end plates, a bottom arranged between the end and side plates below the bottom of said aperture, inner side walls extending upwardly from the bottom adjacent the side edges of the aperture and cooperating with the bottom end portions of the end plates below said aperture to form a pocket, the aperture being capable of receiving a pin and enlargement so that a portion of the enlargement may be positioned in said pocket with the end walls thereof engaging the ends of the enlargement so as to prevent end-play, a block adapted to be positioned on top of said pin, and a wedge for driving said block toward the pin so as to maintain a portion of the enlargement in the pocket.

12. A connection between a pitman rod and a band wheel crank on drilling derricks comprising a pin mounted upon the crank having a cylindrical enlargement, a pair of end plates mounted upon the pitman rod, side plates connecting the side edges of the end plates, there being a rectangular aperture formed in one of the end plates, a bottom arranged between the end and side plates below the bottom of said aperture, inner side walls extending upwardly from the bottom adjacent the side edges of the aperture and cooperating with the bottom end portions of the end plates below said aperture to form a pocket, the aperture being capable of receiving a pin and enlargement so that a portion of the enlargement may be positioned in said pocket with the end walls thereof engaging the ends of the enlargement so as to prevent end-play, and means for maintaining a portion of the enlargement in the pocket, the engaging surfaces of the bottom, side and end walls of the pocket consisting of a bearing metal.

13. A connection between a pitman rod and a band wheel crank on drilling derricks comprising a pin mounted upon the crank having a cylindrical enlargement, a pair of end plates mounted upon the pitman rod, side plates connecting the side edges of the end plates, there being a rectangular aperture formed in one of the end plates, a bottom arranged between the end and side plates below the bottom of said aperture, inner side walls extending upwardly from the bottom adjacent the side edges of the aperture and cooperating with the bottom end portions of the end plates below said aperture to form a pocket, the aperture being capable of receiving a pin and enlargement so that a portion of the enlargement may be positioned in said pocket with the end walls thereof engaging the ends of the enlargement so as to prevent end-play, means for maintaining a portion of the enlargement in the pocket, means providing a lubricant reservoir upon the pitman rod, and means whereby lubricant may be supplied from said reservoir to said pocket.

14. A connection between a pitman rod and a band wheel crank on drilling derricks comprising a pin mounted upon the crank having a cylindrical enlargement, a pair of end plates mounted upon the pitman rod, side plates connecting the side edges of the end plates, there being a rectangular aperture formed in one of the end plates, a bottom arranged between the end and side plates below the bottom of said aperture, inner side walls extending upwardly from the bottom adjacent the side edges of the aperture and cooperating with the bottom end portions of the end plates below said aperture to form a pocket, the aperture being capable of receiving a pin and enlargement so that a portion of the enlargement may be positioned in said pocket with the end walls thereof engaging the ends of the enlargement so as to prevent end-play, means for maintaining a portion of the enlargement in the pocket, means providing a lubricant reservoir upon the pitman rod, and means whereby lubricant may be supplied from said reservoir to said pocket through the side walls thereof.

In testimony whereof I have signed my name to this specification.

OWEN D. MASTERSON.